Figure 1:
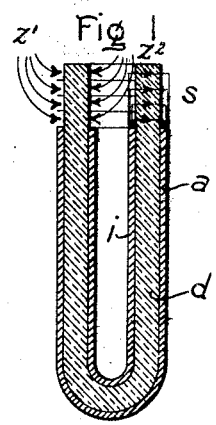

K. KUHLMANN.
CONDENSER.
APPLICATION FILED APR. 29, 1910.

1,000,925.

Patented Aug. 15, 1911.

WITNESSES.
J Earl Ryan
J Ellis Glen

INVENTOR
KARL KUHLMANN
BY
HIS ATTORNEY

UNITED STATES PATENT OFFICE.

KARL KUHLMANN, OF BERLIN, GERMANY, ASSIGNOR TO GENERAL ELECTRIC COMPANY, A CORPORATION OF NEW YORK.

CONDENSER.

1,000,925.  Specification of Letters Patent.  Patented Aug. 15, 1911.

Application filed April 29, 1910. Serial No. 558,489.

*To all whom it may concern:*

Be it known that I, KARL KUHLMANN, a subject of the Emperor of Germany, residing at Berlin, Germany, have invented certain new and useful Improvements in Condensers, of which the following is a specification.

In high voltage condensers in which the plates of opposite polarity are separated by a layer of dielectric, it has been found that the dielectric stress concentrates near the edges of the plates, while at the other points between the plates the stress is nearly uniform throughout the dielectric. By reason of the concentration of the stress condensers made of glass, porcelain, or other materials and constructed after the manner of Leyden jars almost always break down at points which are not covered by the metallic coating or plates and which are near the edges of the plates. Attempts have been made to prevent this breakdown by increasing the thickness of the dielectric near the edges of the plates or at the neck of the condensers when they are made in the form of jars. It has also been proposed to divide the dielectric lengthwise into layers for the purpose of rendering the distribution of stress throughout the dielectric substantially uniform, but owing to the difficulty of securing layers of dielectric of the same strength and thickness at all points, differences of potential develop between the different points on the layers and result in local currents which represent losses in the condenser and also cause heating.

The object of my invention is to prevent the breaking down of the condenser near the edge of the plates and also to provide a condenser in which local currents in the dielectric are prevented and which remains cool under normal operating conditions.

In carrying out my invention heating and puncturing of the dielectric is prevented by reducing the capacity of the edge of the dielectric in any suitable way, preferably by dividing the dielectric into layers or portions and bending the layers apart so as to produce an air gap or recess in the end surfaces of the dielectric. Local currents and heating in the dielectric are prevented by means of a metallic sheet mounted between the plates of the condenser and insulated from them, and preferably so arranged that the ends of the metallic sheet project far enough to be in contact with the air surrounding the condenser and to act as cooling surfaces to keep the temperature of the condenser within desirable limits.

My invention will best be understood in connection with the accompanying drawings which show some of the numerous ways in which my invention may be embodied and in which—

Figure 2:
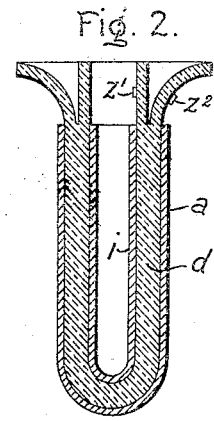
Figure 3:
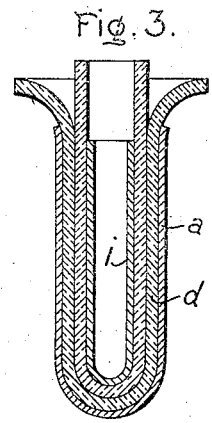
Figure 4:
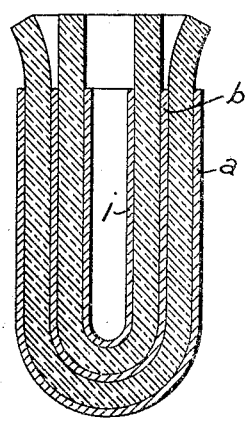
Figure 5:
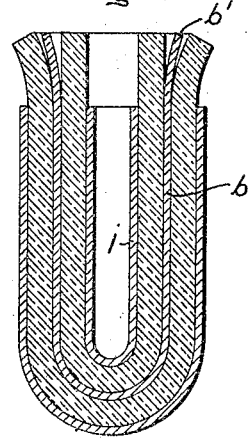
Figure 6:
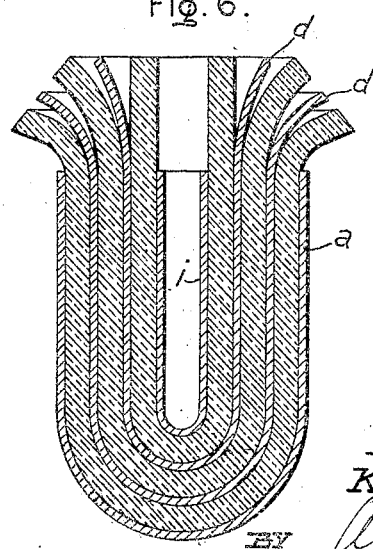

Figure 1 is a longitudinal section of a condenser of the usual type showing diagrammatically how the dielectric is perforated near the edges of the plates; Fig. 2 is a longitudinal section of one form of condenser embodying my invention; Fig. 3 is a longitudinal section of a form of condenser embodying my invention and showing the dielectric divided lengthwise into two layers; Fig. 4 is a longitudinal section of a condenser having two layers of dielectric separated by a metallic sheet; Fig. 5 is a longitudinal section of a condenser similar to that shown in Fig. 4 with the ends of the metallic sheet extended to form cooling surfaces; and Fig. 6 is a longitudinal section of a form of condenser having numerous plates which may at will, by suitable means, be connected either in series or in parallel.

If a condenser, such as a Leyden jar, is connected to an electrical machine, there is observed at the moment the spark passes between the conductors of the machine a marked coruscation over the uncoated neck of the dielectric. Shortly before the spark passes between the conductors of the machine this coruscation is also present, but to a much smaller extent. If, in Fig. 1, we assume the individual and opposed cylindrical surfaces $Z^1$ and $Z^2$ to be the terminal planes of the dielectric $d$ and the outside conducting layers of the cylindrical surface as the coatings of elementary condensers, the charging and discharging of these elementary condensers takes place from the edges of the metallic coatings $i$ and $a$ and that which is observed as a coruscation $s$ is nothing more than a charging current which passes into the individual condenser elements. This current is, of course, strongest where it passes out of the coating and decreases with the distance along the dielectric from the edge of the coating. At the moment when the spark passes between the conductors of the electrical machine, the condenser circuit discharges at high frequency and since the charging current of each condenser is higher in proportion to frequency, the coruscation will be much greater at the passage of the spark in accordance with the explanation above made. The coruscation, however, heats the dielectric at the edges and on account of the poor heat conductivity of all dielectrics the heat is distributed very slowly, with the result that a great local increase of temperature occurs in the dielectric, which is therefore readily broken down at the edges where the coruscation is greatest.

The danger of the dielectric being punctured at the edge of the coating is very greatly decreased in the form of invention embodied in Fig. 2, by reducing the capacity at the edges by dividing the dielectric in the middle and bending the two portions apart, preferably in such a way that one of the portions has a curvature of a relatively great radius. As is evident from Fig. 2, the diverging portions of the dielectric which project beyond the edges of the outer plate $a$ and of the inner plate $i$ have between them an air gap or recess which is in effect introduced between the terminal planes of the elementary condensers $Z^1$ and $Z^2$, which, of course, are not present in the condensers as actually constructed, but are indicated only for the purpose of illustrating the principle of my invention. Since the dielectric constant of air is considerably smaller than that of the solid dielectric generally used, the capacity of the elementary condensers $Z^1$ and $Z^2$ is quite considerably reduced, and in consequence the amount of coruscation, and therefore the liability of breakdown at points on the neck of projecting portion of the dielectric is reduced. Any other dielectric which will have substantially the same properties as air may be introduced into the gap or recess between the diverging portions of the dielectric so long as the capacity is reduced and the breaking down at the edge of the plates is prevented.

Another form of condenser in which my invention may be embodied is shown in Fig. 3, in which the dielectric is divided for its entire length into layers or laminations and the laminæ are bent apart, fanwise, at the edge, to reduce the capacity and to leave an air gap or recess between the portions of the end of the dielectric. Simply for convenience the dielectric is shown as divided into two layers, although it is obvious that as many layers as desired may be used. Where the dielectric is laminated it is practically impossible to make each layer have the same properties throughout and consequently along the surface of the different layers a difference of potential often appears, which results in local currents upon the surface of the layers great enough to cause losses and to produce heating. In accordance with my invention, these objections are overcome by introducing between the different layers of the dielectric a metallic sheet in the manner shown diagrammatically in Fig. 4, in which the metallic sheet $b$ is embedded in a dielectric between the plates of the condenser and is insulated from the plates. In order to maintain the temperature of the condenser within desirable limits the metallic sheets $b$ preferably have their ends $b'$ extended, as shown in Fig. 5, so that the ends $b'$ project into the recesses in the end of the dielectric and are exposed to the air surrounding the condenser, whereby any heat generated in the condenser is conducted along the metallic sheets $b$ and is dissipated by the ends $b'$ of the sheets.

My invention also provides a condenser comprising a plurality of plates which may be, at will, connected either in parallel or in series and one form of my invention is shown in Fig. 6, in which the intermediate plates $d$ are provided with projecting ends similar to the metallic sheet $b$ in Fig. 5, and by any suitable switching mechanism the outer, intermediate, and inner plates may be connected either in series or in parallel, as desired.

My invention may be embodied in many other forms than the precise arrangement shown, and I therefore do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is,—

1. A condenser comprising a dielectric having its end divided into diverging portions.

2. A condenser comprising a dielectric having its end divided into diverging portions, one of which has a curvature of relatively large radius.

3. A condenser having a dielectric divided at its end into portions which are bent away from one another fanwise.

4. A condenser comprising a dielectric divided at the point of greatest stress into portions separated from each other to leave a space between them.

5. A condenser comprising a dielectric divided at a point of stress into portions which are separated to leave between them a cavity for containing a material with properties different from said dielectric, whereby the capacity of said dielectric is varied.

6. A condenser comprising a plate and a dielectric projecting beyond the edge of the plate with its projecting part divided into diverging portions.

7. A condenser having coöperating plates, and a laminated dielectric between them with the ends of the laminæ diverging beyond the edges of the plates.

8. A condenser comprising a dielectric having a recess in the end thereof, and a metallic sheet embedded in said dielectric with its end projecting into the recess.

9. A condenser having a laminated dielectric and a metallic sheet between the laminæ of the dielectric with its end projecting into the medium surrounding the condenser.

10. A condenser comprising plates and an insulated metallic sheet mounted between said plates with its end projecting beyond the edges of said plates.

11. A condenser comprising plates, a dielectric between said plates with its end projecting beyond the edge of said plates and divided into diverging portions to leave a recess in the end of said dielectric, and a metallic sheet mounted between and insulated from said plates with its end projecting into said recess.

In witness whereof, I have hereunto set my hand this 13th day of April, 1910.

KARL KUHLMANN.

Witnesses:
 HENRY HASPER,
 WOLDEMAR HAUPT.